Figure 1:
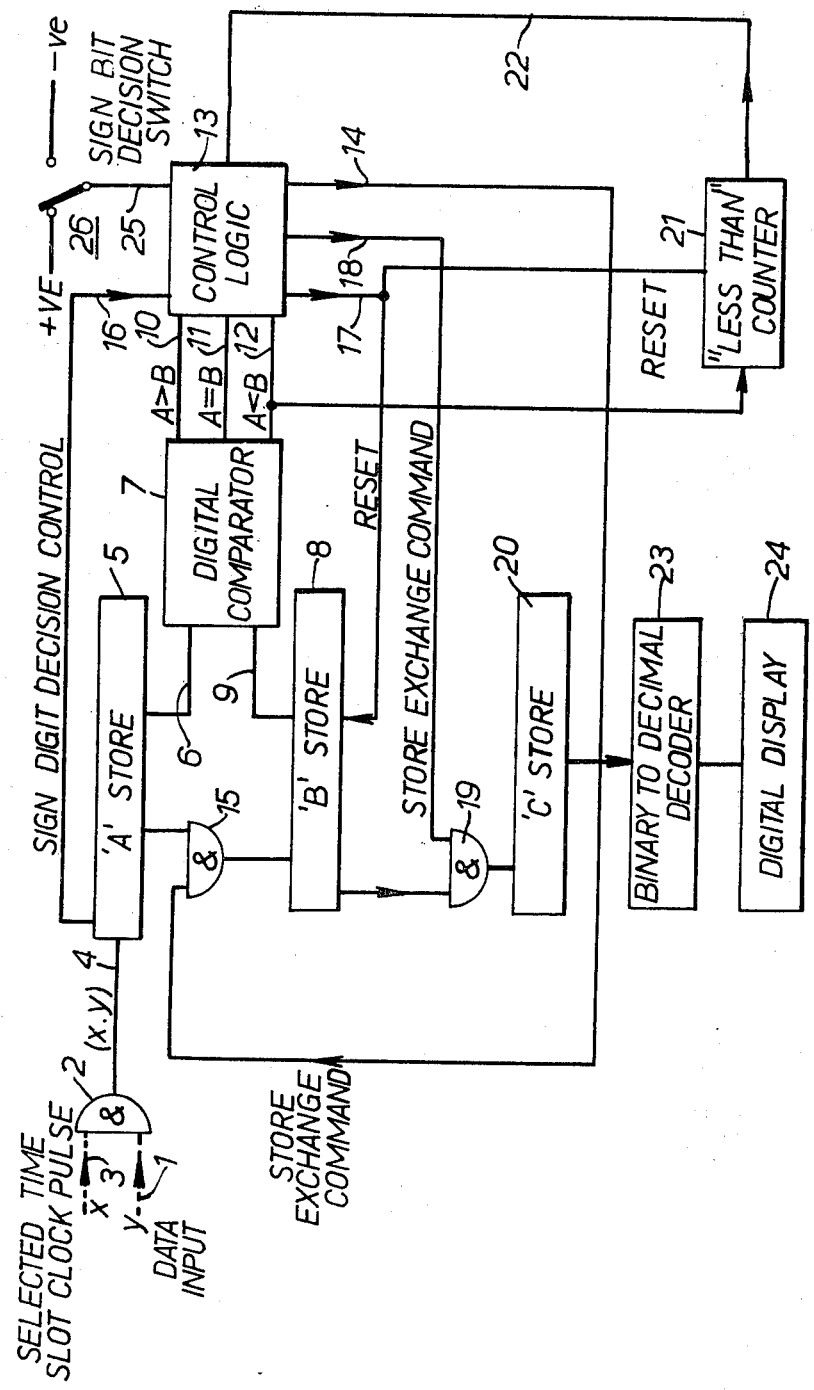

United States Patent [19]
Bussey

[11] 3,924,078
[45] Dec. 2, 1975

[54] APPARATUS FOR DISPLAYING AN EXTREME VALUE AMONG A SUCCESSION OF DIGITAL VALUES

[75] Inventor: Christopher John Bussey, High Wycombe, England

[73] Assignee: The Post Office, London, England

[22] Filed: Apr. 10, 1974

[21] Appl. No.: 459,562

[30] Foreign Application Priority Data
Apr. 19, 1973 United Kingdom............... 19143/73

[52] U.S. Cl..... 179/15 BF; 235/151.31; 235/92 CA; 235/92 MT; 324/99 D; 324/103 P; 340/324 R
[51] Int. Cl.²............................................. H04J 3/14
[58] Field of Search...... 235/151.31, 92 EL, 92 CA, 235/92 MT; 324/103 P, 99 D; 340/324 R; 179/15 BF

[56] References Cited
UNITED STATES PATENTS

| | | | |
|---|---|---|---|
| 2,949,228 | 8/1960 | Bailey et al. | 235/92 CA |
| 3,057,972 | 10/1962 | Mann | 179/15 BF |
| 3,610,894 | 10/1971 | Drury et al. | 235/92 EL |
| 3,683,115 | 8/1972 | Schellenberg | 179/15 BF |
| 3,683,345 | 8/1972 | Faulkes et al. | 235/92 CA |
| 3,735,387 | 5/1973 | Miller | 235/92 CA |
| 3,790,767 | 2/1974 | Alexander | 235/92 CA |
| 3,818,342 | 6/1974 | Stevens | 235/92 CA |
| 3,818,483 | 6/1974 | Yamauchi | 235/92 CA |
| 3,830,982 | 8/1974 | Christiansen | 179/15 BF |

*Primary Examiner*—David L. Trafton
*Attorney, Agent, or Firm*—Hall & Houghton

[57] ABSTRACT

Apparatus for displaying the maximum or minimum of a series of digitally coded values having a register for storing the highest or lowest value that has so far occurred, in which the contents of the register are updated whenever a value occurs which is more extreme than the stored value. The stored value is displayed either when an equal value occurs in the series or after a predetermined number of lower values has occurred. The stored value is cleared when 4096 lower values have occurred to enable the apparatus to follow a reduction in the maximum level or an increase in the minimum level. A method employing the apparatus for testing a pulse code modulation channel is described.

6 Claims, 2 Drawing Figures

APPARATUS FOR DISPLAYING AN EXTREME VALUE AMONG A SUCCESSION OF DIGITAL VALUES

This invention relates to apparatus for displaying an extreme value among a succession of digital values, and is particularly, but not exclusively concerned with displaying the maximum or minimum value of a digitally coded word having a predetermined number of bits occurring in a succession of such words such as would be transmitted along a pulse code modulation multiplex system. Such apparatus is of value in the testing of a pulse code modulation multiplex system, and the invention also relates to a method of testing such a system.

In the testing of pulse code modulation multiplex equipment, it is required to extract successive multi-digit words from a particular multiplex channel and ascertain the maximum or minimum digital value occurring in the channel whilst a test oscillation of known amplitude is applied to the equipment, to check whether the conversion to digital form is being performed correctly. Hitherto, the testing procedure relied on the use of a fixed phase relationship between the test oscillation and the sampling frequency of the pulse code modulation equipment, with a view to displaying the individual codes resulting from sampling of the oscillation signal at a smaller rate than that at which they actually occur. By choosing the frequency and phase of the oscillation correctly it was possible to arrange the samples so that they alternated between the maximum and minimum values of the analogue signal and it then became possible to display the peak values on a counter. However, the operation of this method required no small amount of skill on the part of the operator and could easily result in obtaining an erroneous indication of the peak value.

It is an object of the present invention to provide a method and apparatus in which the above difficulty is avoided.

According to one aspect of the present invention, there is provided apparatus for displaying an extreme value among a succession of digital values, including first and second storage registers, input means for entering successive digital values and storing them in the first register, means for transferring digital values from the first register and entering and storing them in the second register, means for comparing the magnitude of a value stored in the first register with that of a preceding value stored in the second register, means responsive to an output from the comparing means for selectively transferring the value stored in the first register to the second register dependent upon the relative magnitudes of the compared values at any instant, and means for displaying a representation of the value in the second register which is the required extreme value reached at that instant from among the values applied to the first register.

The comparing means may be arranged to produce an additional output when the value stored in the second register is equal to that stored in the first register, and the displaying means may respond to the additional output to display the value in the second register.

The apparatus may include a counter for counting the number of comparisons in which the value in the first register is less than the value in the second register. As an alternative to the arrangement described above the displaying means may be connected to respond to the total in the counter reading a predetermined value to display the value in the second register.

The comparing means may have three outputs, one indicating that the value in the first register exceeds that in the second, one indicating that the values in the registers are the same, and one indicating that the value in the second register exceeds that in the first.

The counter referred to above may be arranged that on attaining a predetermined limit it produces an output signal causing the resetting of the counter to zero and also the clearance of the current maximum value held in the second register at that particular time.

According to a second aspect of the invention a method of testing pulse code modulation equipment includes applying a constant amplitude oscillation to the equipment, the oscillation having a frequency having no simple relationship to the sampling frequency of the equipment, and deriving from an output of the equipment an indication of an extreme value attained by successive digital values present in the output.

Figure 2:
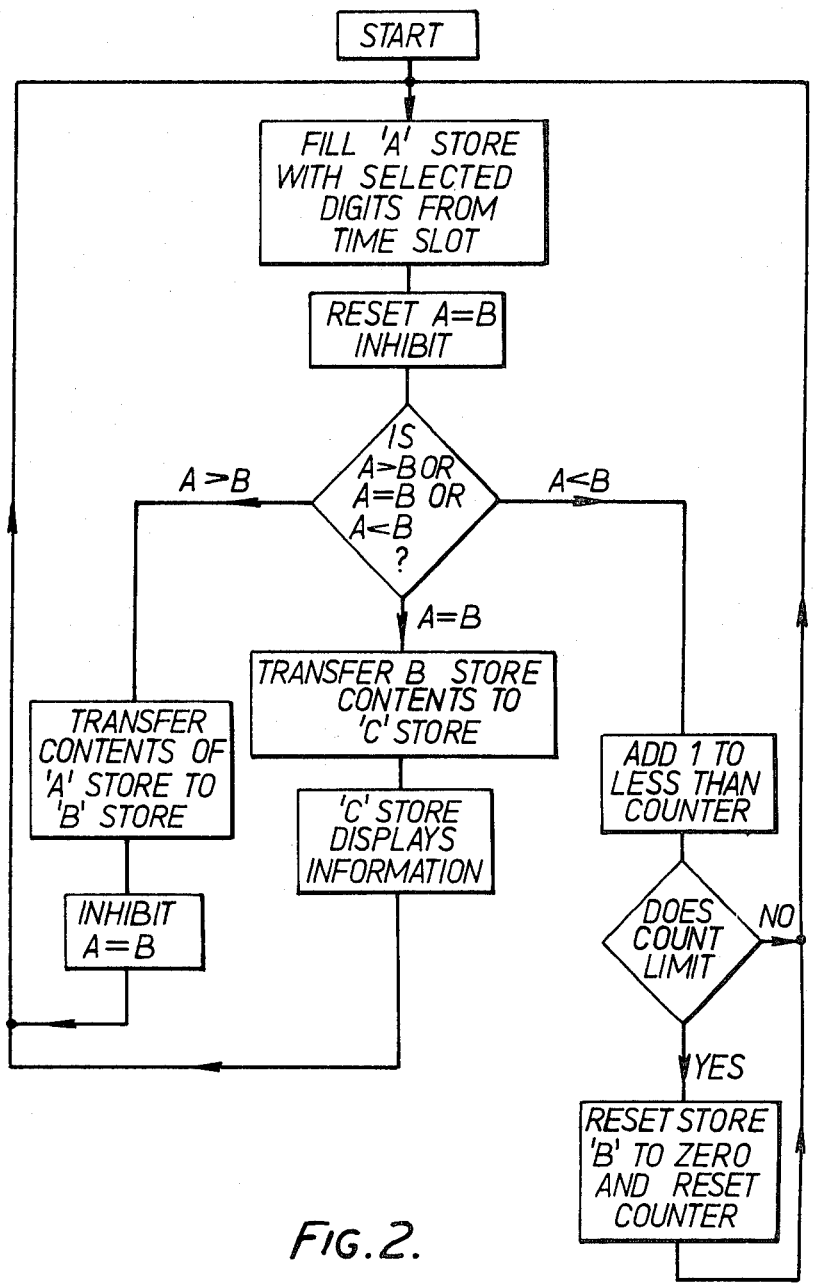

In order that the invention may be fully understood and readily carried into effect, it will now be described with reference to the accompanying drawings in which:

FIG. 1 shows in block diagrammatic form one example of apparatus according to the invention; and FIG. 2 shows a flowchart of the operation of the apparatus shown in FIG. 1.

Referring to FIG. 1 of the accompanying drawings a p.c.m. multiplex input signal $y$ is applied via a conductor 1 to an AND gate 2, which gate is controlled by a selected time slot pulse $x$ applied to a conductor 3, so that the output of the gate 2 on the conductor 4 consists of successive words from the same time slot. The conductor 4 is connected to the input of a storage register 5 having sufficient storage elements for the retention of an entire word. The register 5 is referred to as the A store. The storage elements of the register 5, except that for the most significant digit which indicates the sign of the stored value, are connected through a conductor or group of conductors 6 to one input of a digital comparator 7, the other input of which is derived through a conductor or group of conductors 9 from the storage elements of another storage register 8, referred to as the B store.

The comparator 7 has three outputs which are connected by means of respective conductors 10, 11 and 12, to a control logic unit 13, and output signals appear on the respective conductors if the value in the A store 5 is greater than that in the B store 8, the two values are equal, and the value in the A store 5 is less than the value in the B store 8.

The control logic unit 13 provides on a conductor 14 a control signal for an AND gate or group of AND gates 15 coupling the outputs of the storage elements of the A store 5 in series or parallel to the inputs of the storage elements of the B store 8. A conductor 16 is connected from the storage element for the most significant digit of the value stored in the A store 5 to the control logic unit 13 to apply to that unit an indication of the sign of the value stored in the A store so as to permit the arrangement to handle negative as well as positive values. On another conductor 17, the control logic unit 13 generates a resetting signal for resetting the value stored in the B store 8 to zero. In response to a signal on the conductor 11, the unit 13 produces on a conductor 18 a signal controlling an AND gate or group of AND gates 19 enabling the transfer in series or parallel of the value in the B store 8 to a further storage register 20 referred to as the C store. Like the A store 5, both the B store 8 and the C store 20 have sufficient storage elements for recording an entire digital word. In addition to being connected to the control logic unit 13, the conductor 12 is connected to a counter 21 for counting the number of comparisons in which the value in the A store is less than that in the B store. When the total in the counter 21 reaches a predetermined limit, it applies a signal over a conductor 22 to the control logic unit 13 to cause it to emit a signal on the conductor 17 resetting the B store 8 and also the counter 21 to zero. The value stored in the C store is applied via a binary decimal decoder 23 to a decimal digital display 24. The control logic unit 13 receives yet another input over a conductor 25 from a sign bit decision switch 26, which is set by an operator depending upon whether he requires a positive or negative extreme value to be displayed.

The operation of the arrangement shown in FIG. 1 may be understood from the flowchart of the system shown in FIG. 2 of the accompanying drawings. In order to follow the flowchart the B-store 8 is assumed to be cleared and the counter 21 reset to zero at the beginning of a new sequence. At the START of the sequence successive digital words from the same time slot of a p.c.m. multiplex input are selected by the gate 2 as previously described and entered into the A-store 5. The digits of the A-store 5, except that for the most significant digit which represents the sign, are then fed into the digital comparator 7 where the digital value is compared with that recorded in the B-store 8 (initially zero). The three possible results of this comparison are as follows:

i. The A store binary weight is greater than that in the B store (A>B). In this case the contents of the A store 5 are transferred as previously described into the B store 8 in response to a control signal from the control logic unit 13. To avoid the system reacting to the A=B condition which temporarily occurs following this transfer an inhibit A=B condition is applied within the logic unit 13.

ii. The A store binary weight is equal to that in the B store (A=B). In this case an output signal from the comparator 7 causes the control logic unit 13 to emit a control signal on conductor 18 and the contents of the B store 8 are consequently transferred to the C store 20 as previously described, leaving the B store 8 unchanged. The value residing in the C store 20 is then connected via the binary to decimal decoder 23 and a read-out of the contents of C store 20 is displayed on the digital display 24.

iii. The A store binary weight is less than that in the B store (A<B). In this case the occurrence of an output from the comparator 7 which indicates that the value in the A store 5 is less than that in the B store 8 is counted by the counter 21. If the total counted is less than a predetermined limit which is determined by the probability of finding two equal samples within the count period and is dependent on the frequency of the test oscillation relative to the sampling frequency, then the system returns to START and the cycle is continued with the contents of the next word. When the total in the counter 21 reaches its predetermined limit it applies a signal to the control logic unit 13 which causes it to produce an output signal resetting the B store 8 and also the counter 21 to zero and again the system returns to START.

Referring again to FIG. 1, successive digital words from the same time slot of the p.c.m. multiplex input are selected by the gate 2 and applied via the conductor 4 to the A store 5. After every entry of a word into the A store 5, the digits except for the most significant, which represents the sign only of the value, are read either serially or in parallel into the digital comparator 7 where the digital value is compared with that recorded in the B store 8. In the coding usually employed in the pulse code modulated signals for which the arrangement is intended, all digits but the most significant digit of a word indicate the magnitude of the value represented, and the most significant digit indicates whether the value is positive or negative; because of this the comparator 7 can operate in the same way for both positive and negative values. The result of this comparison is given as an output on one of the conductors 10, 11 and 12, connected to the control logic unit 13. If the magnitude of the value in the A store 5 is greater than that in the B store 8, the unit 13 produces an output on conductor 14, which enables the AND gate or gates 15 to effect the transfer of the value in the A store 5 into the B store 8. If, however, the contents of the A store are smaller than or equal to the contents of the B store, no signal is produced on the conductor 14 and no transfer via the gate 15 is effected.

An output on the conductor 11 from the comparator 7, indicating that the values in the A and B stores are equal, causes the control logic unit 13 to open the AND gate or gates 19 by means of a signal on the conductor 18 to cause the transfer of the value in the B store 8 into the C store 20. The value residing in the C store 20 is permanently displayed in decimal form by the display 24 after decoding of the binary information in the store 20 to decimal form by the decoder 23.

In order to ascertain whether the value in the B store is greater than a few or many successive values applied to the A store, the counter 21 counts the outputs on the conductor 12 from the comparator 7 which indicate that the value in the A store is less than the value in the B store. When the total in the counter 21 reaches a predetermined limit, it produces an output signal on the conductor 22 which causes the control logic unit 13 to produce an output on the conductor 17 to reset to zero both the B store and the counter 21. The counter 21 is provided so that if the input signal level falls the value displayed fairly quickly follows it. With a threshold value of 4096 and a pulse code modulation multiplex structure having 8000 frames per second the counter will reach the threshold value in just over half a second following a reduction in signal level.

The sign digit, stored in the storage element for the most significant digit in the A store 5, is transferred via the conductor 16 to the control unit 13, where it is compared with the input on the conductor 25 from the sign bit decision switch 26 to ascertain whether the polarity of the value in the A store 5 is that set by the switch 26. Although the input oscillation to the pulse code modulation equipment is balanced, there may be some slight unbalance in the equipment which could render the maximum value in digital form dependent on its sign, and thereby reduce the accuracy of the test on the equipment. It is thus desirable to test both polarities independently. If the sign digit indication received by the unit 13 via the conductor 16 is not that set by the switch 26, the unit 13 is inhibited from producing a signal on the conductor 14 for enabling a transfer from the A store to the B store. The sign digit need not necessarily occupy the most sigificant digit position and the connection of the conductor 16 to the A store 5 could be changed accordingly. The other outputs from the A store must also be changed. The storage registers 5, 8 and 20 may all be of the same construction and typically would consist of 8 D-type bistable triggers which require a clock input to transfer data from input to output. The registers may be arranged to operate in serial or parallel, but with operation in parallel it must be borne in mind that the input and output connections to the stores must be multiple. The input to the A store 5 must, of course, be serial because it is derived from a p.c.m. multiplex time slot.

The digital comparator 7 must be able to act in serial or parallel manner depending on the operation employed in the A and B stores 5 and 8. Considering the operation of the comparator 7 in response to serial inputs, from which an equivalent mode of operation for parallel inputs can readily be deduced, the second most significant bits (assuming that the most significant digit is allocated to the sign) from the A and B stores 5 and 8 are applied to an equivalence gate, if they are the same the next most sigificant bits are applied to the gate and so on until a difference is found or all of the digits have been compared. Clearly, if all of the digits are the same then the stored values are equal in magnitude. On the other hand the stored value having the most significant 1 which is not to be found in the other value will be the greater. Once a difference between the two values has been discovered, there is no need to proceed further with the comparison of bits.

It may be desirable to combine the output of the comparator 7 on the conductor 12 with the time slot pulse on the conductor 3 so that the counter 21 is only incremented at the end of a time slot. This has the advantage that any decision which might result from the counter being incremented cannot affect the inputs to the comparator 7 giving rise to that decision.

In a modification of the apparatus described above the counter 21 may be arranged to produce an additional output when the total in it reaches a threshold value, below the predetermined limit, the gate or gates 19 being responsive to the additional output to cause a display of the value in the B store 8. In this case the output on the conductor 11 (A=B) of the comparing means 7 is not required.

Although in the embodiment of the invention described above the display is in straightforward decimal form, it will be appreciated that the display may take other forms. For example, the display may be in decibels, so that a logarithmic conversion is required. Alternatively, the display may be left in binary code.

The actual limit value at which the counter 21 produces the output on the conductor 22 for optimum performance of the apparatus will depend to some extent on the statistics of the input information applied to the conductor 1, and for some applications it may be desirable to make the threshold value adjustable, for example, by selectively adding further stages to the counter 21.

I claim:

1. A method of testing a pulse code modulation equipment in which a signal to be encoded is sampled at a fixed sampling frequency and the samples are encoded in digital form to produce a desired pulse code signal, the method including
    a. applying as the signal to be encoded an oscillation of known steady amplitude and of frequency bearing no simple relationship to the sampling frequency of the equipment,
    b. comparing the digitally encoded samples of the pulse code signals with a previously occurring maximum encoded sample and up-dating the maximum sample whenever it is exceeded by a subsequent sample, and
    c. displaying the value of the maximum sample, thereby indicating the encoded value of the known amplitude.

2. A method according to claim 1 wherein the value of the maximum sample is displayed when a subsequent digitally encoded sample is found to be equal to the previously occurring maximum sample.

3. A method according to claim 1 including counting the number of digitally encoded samples of value less than the maximum encoded sample following each up-dating of the maximum sample, and resetting the maximum encoded sample to zero when the number of digitally encoded samples counted exceeds a predetermined value.

4. A method according to claim 3 wherein the value of the maximum sample is displayed when the number of digitally encoded samples counted exceeds a second value lower than the predetermined value.

5. A method according to claim 3 wherein the value of the maximum sample is displayed when a subsequent digitally encoded maximum value is found to be equal to the previously occurring maximum sample.

6. A method according to claim 1 wherein the encoded samples include indications of their polarities, the method further including the step of selecting the digitally encoded samples in accordance with their polarities before their comparison with the previously occurring maximum sample, whereby separate displays of maximum samples of both polarities can be produced.

* * * * *